United States Patent [19]
Stallings

[11] Patent Number: 5,673,899
[45] Date of Patent: Oct. 7, 1997

[54] COMPOUND ANGLE DRIVE FOR A TIRE LIFT MECHANISM FOR RAISING AND LOWERING A VEHICLE SPARE TIRE

[76] Inventor: Hulon D. Stallings, 8730 Sarah La., Grosse Isle, Mich. 48138

[21] Appl. No.: 598,502

[22] Filed: Feb. 8, 1996

[51] Int. Cl.⁶ .................................................. B66D 1/00
[52] U.S. Cl. ................................. 254/323; 464/138
[58] Field of Search ............................ 464/137, 138; 254/323

[56] References Cited

U.S. PATENT DOCUMENTS

| | | | |
|---|---|---|---|
| 881,865 | 3/1908 | Nichols | 464/137 |
| 981,736 | 1/1911 | Zock | 464/138 |
| 1,400,063 | 12/1921 | Hinton | 464/138 |
| 2,833,544 | 5/1958 | Blades | 464/137 |
| 3,063,264 | 11/1962 | Forrest | 464/138 |
| 4,915,358 | 4/1990 | Stallings | 254/323 |
| 5,060,912 | 10/1991 | Guarr | 254/323 |
| 5,188,341 | 2/1993 | Greaves | 254/323 |
| 5,251,876 | 10/1993 | Stallings | |

FOREIGN PATENT DOCUMENTS 331323  7/1930  United Kingdom ............ 464/137

*Primary Examiner*—Katherine Matecki
*Attorney, Agent, or Firm*—Dykema Gossett PLLC

[57] ABSTRACT

An improved compound angle drive is disclosed in which a drive tube selectively rotates a driven shaft to raise and lower a cable attached to a spare tire. The drive tube is connected to the driven shaft through a connection formed of a plurality of circumferentially-spaced pins which are received within notches provided in the driven disc of the driven shaft. A spring is located between the driven shaft and the drive tube to eliminate looseness.

17 Claims, 3 Drawing Sheets

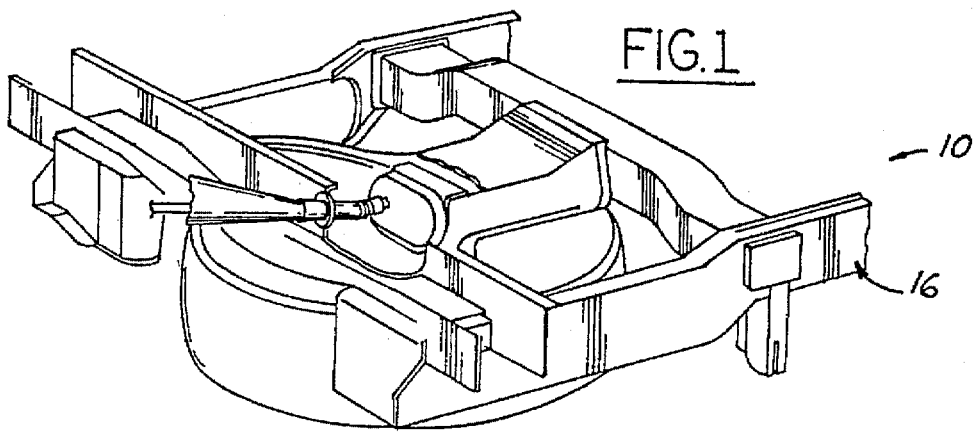
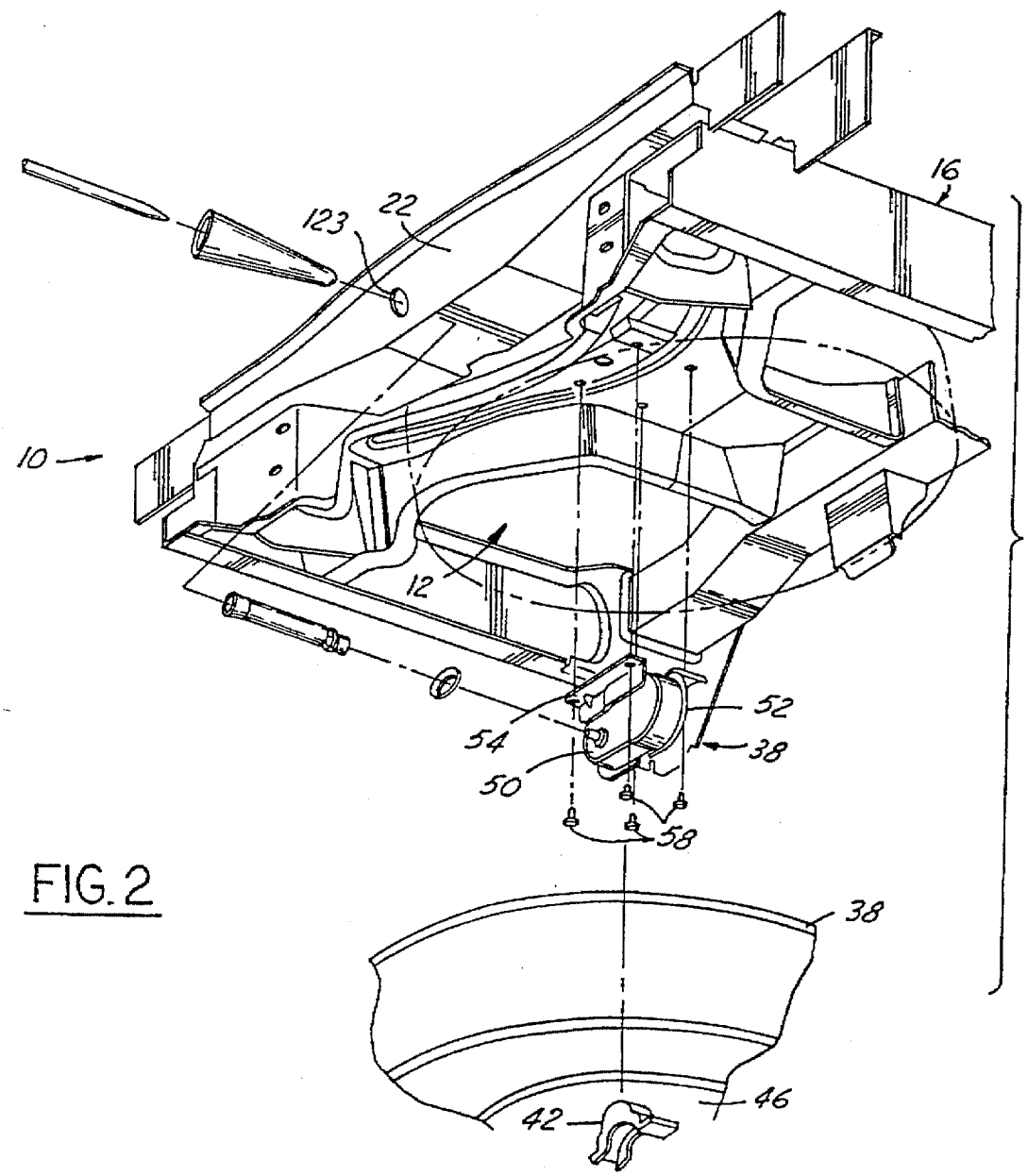

5,673,899

1

COMPOUND ANGLE DRIVE FOR A TIRE LIFT MECHANISM FOR RAISING AND LOWERING A VEHICLE SPARE TIRE

FIELD OF THE INVENTION

This invention relates to an improved compound angle drive for raising and lowering a vehicle spare tire.

BACKGROUND OF THE INVENTION

It is well known in the industry to store a spare tire at the underside of a vehicle, particularly in vans. Tire lift mechanisms are utilized for raising and lowering the spare tire from beneath the vehicle. A cable extends from the tire lift assembly or mechanism and a rotating drive is arranged upon a first axis for lowering and raising the cable, to thereby correspondingly raise and lower the spare tire. An access opening is formed through the rear of the vehicle body, and a tool such as a jackhandle may be inserted through the access opening and used to raise and lower the cable.

One successful example of such a tire lift mechanism is disclosed in my earlier U.S. Pat. No. 4,915,358, issued Apr. 10, 1990 entitled "Compound Angle Drive for Raising and Lowering Vehicle Spare Tire". This patent discloses a drive tube which is selectively driven by a jackhandle for raising and lowering the cable. The drive tube is rotatably received in a bearing located beneath the underside of the vehicle. The drive tube drives a driven shaft which is connected to the actual drive for the cable. The connection between the drive tube and the driven shaft is a univeral-type connection wherein the drive tube has a plurality of circumferentially spaced drive pins received in slots provided in a disk of the driven shaft. The drive pins may pivot relative to the slots such that the axis of rotation of the drive tube may be at an angle relative to the axis of rotation of the driven shaft. This facilitates a use of the assembly, such that a user is not required to bend to a low vertical position to raise and lower the tire.

The above patented mechanism has proven commercially successful along with the drive for a tire lift mechanism disclosed and claimed in my later U.S. Pat. No. 5,251,876, issued Oct. 12, 1993. The improvements of the present invention are directed to the universal connection between the drive tube and the driven shaft and in the arrangement in which the component parts of the tire life mechanism are constructed and assembled.

SUMMARY OF THE INVENTION

It is a feature of the present invention to provide an improved compound angle drive for a tire lift mechanism for raising and lowering a vehicle spare tire.

Another feature of the present invention is to provide a compound angle drive having a drive tube which is connected to a driven shaft through a universal connection which includes a number of drive pins carried by a plug located in the drive tube, with the drive pins being received in notches provided on a drive disk carried by the driven shaft. With such a construction the pins carried by the drive tube may pivot within the notches while at the same time still transmitting the drive from the drive tube to the driven shaft.

Still another feature of the present invention is to provide a tire lift mechanism comprising a cable, an elongated drive tube having a first longitudinal axis of rotation and a driven shaft having a second longitudinal axis of rotation adapted to rotate structure for raising and lowering the cable. With such a structure, the driven shaft is selectively driven by the drive tube, with the drive tube and the driven shaft being operatively connected by a connection such that the first axis of rotation of the drive tube may be nonparallel to the second axis of rotation of the driven shaft.

A further feature of the present invention is that the drive tube has a pair of ends including a leading end and a trailing end, with the trailing end being flared to form a funnel having an entrance opening. A first plug is located in the driven tube adjacent the funnel and has a generally axially extending opening therein.

A still further feature of the present invention is that the tire lift mechanism includes a second plug at the leading end of the drive tube, with the second plug having a centrally located recess in the end thereof facing the driven shaft for the reception of a spring.

Another feature of the present invention is to provide a tire lift mechanism of the aforementioned type wherein the drive tube includes a plurality of circumferentially spaced drive pins carried by the second plug and surrounding the recess. With such a constructions the drive pins extend in a direction away from the second plug toward the driven shaft.

Still another feature of the present invention is to provide a tire lift mechanism of the aforementioned type wherein the driven shaft has thereon a sleeve member having a leading end forming a tubular sleeve and a trailing end. The sleeve of the leading end of the sleeve member receives the driven shaft and is connected thereto while the sleeve member at the trailing end thereof has an integral drive disc. With such a constructions the drive disc is provided with notches on the periphery thereof for receiving the drive pins to permit the drive pins to pivot within the notches but still transmit rotation to the driven shaft.

A further feature of the present invention is to provide a tire lift mechanism of the aforementioned type wherein a spring is located in the recess between the second plug and the drive disc to urge the disc against the heads provided on the pins.

A still further feature of the present invention is to provide a tire lift mechanism having a sturdy structure and is of lightweight construction.

Another feature of the present invention is to provide a tire lift mechanism which is economical to construct, efficient in operation and which will provide long service.

Further features and advantages of the present invention will become apparent to those skilled in the art to which the invention pertains as the ensuing description proceeds.

The features of novelty that are considered characteristics of this invention are set forth with particularity in the appended claims. The organization and method of operation of the invention itself will best be understood from the following description when read in connection with the accompanying drawings.

BRIEF DESCRIPTION OF THE DRAWINGS

FIG. 1 is a fragmentary pictorial view of a part of a vehicle, such as a van, illustrating the understructure for supporting a vehicle spare tire and cable lift assembly connected thereto and including the improved compound angle drive of the present invention.

FIG. 2 is fragmentary exploded view of the underside of a vehicle, such as a van, illustrating the tire lift mechanism including the compound angle drive, tire lift mechanism and tire in disassembled relation.

3

Figure 3:
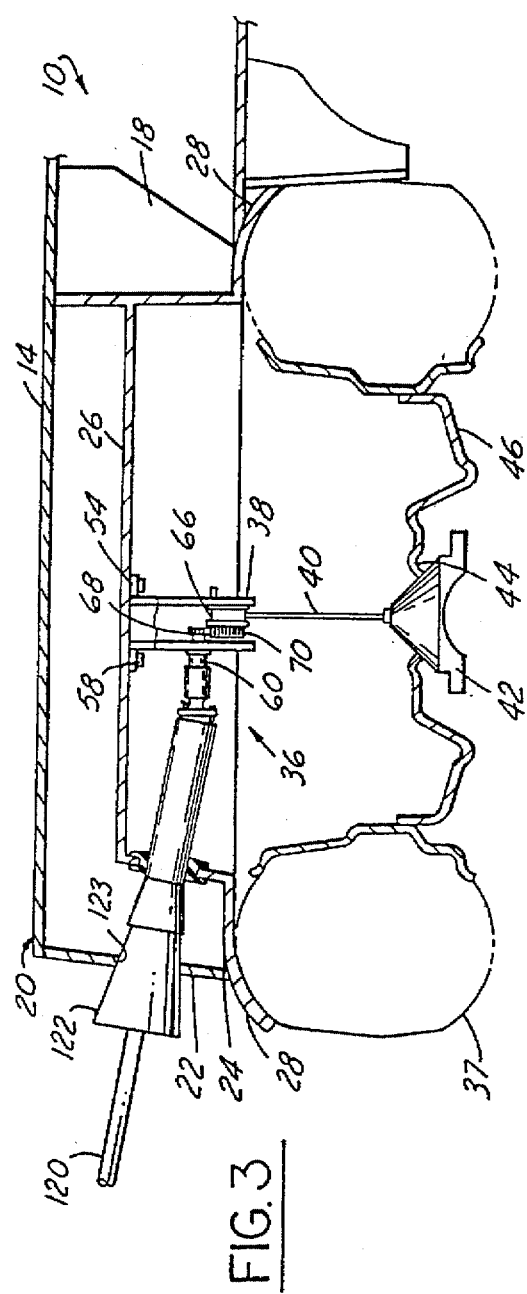

FIG. 3 is a longitudinal sectional view of a portion of a vehicle body illustrating the assembly of the spare tire into a supporting bracket held in place by the tire lift mechanism or assembly.

Figure 4:
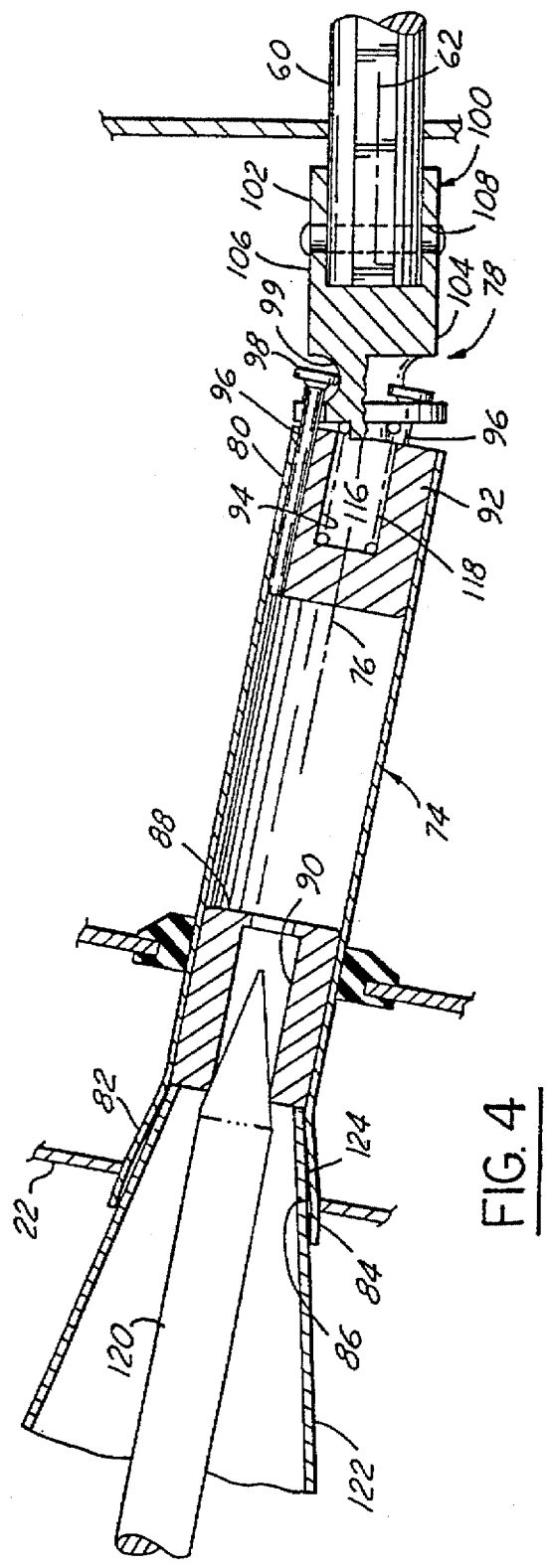

FIG. 4 is a fragmentary longitudinal sectional view of the improved compound angle drive.

Figure 5:
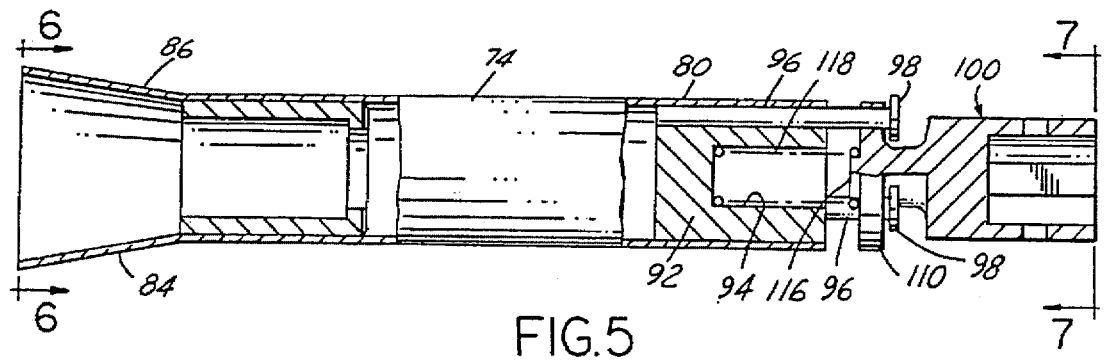

FIG. 5 is an elevational view, partly in section, of the compound angle drive.

Figure 6:
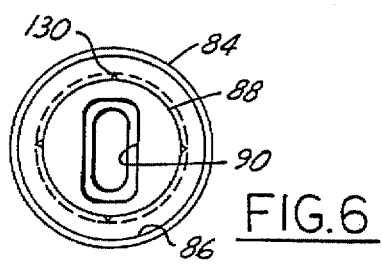

FIG. 6 is an end view of the compound angle drive looking in the direction of arrows 6—6 of FIG. 5.

Figure 7:
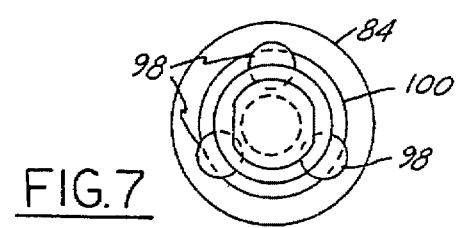

FIG. 7 is an end view of the compound angle drive looking in the direction of arrows 7—7 of FIG. 5.

Figure 8:
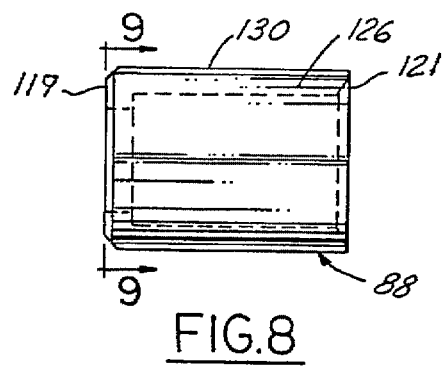

FIG. 8 is an elevational view of the first plug or insert for incorporation in the drive tube.

Figure 9:
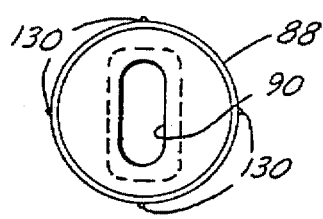

FIG. 9 is an end view of the first plug looking in the direction of arrows 9—9 of FIG. 8.

Figure 10:
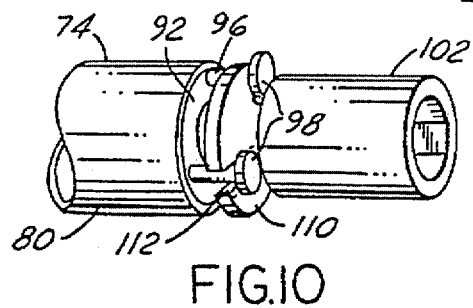

FIG. 10 is a fragmentary perspective view of the compound angle drive showing the universal connection between the drive pins and the drive disk.

It will be understood that the above drawings illustrate merely a preferred embodiment of the invention and that other embodiments are contemplated within the scope of the claims hereafter set forth.

DETAILED DESCRIPTION OF THE PREFERRED EMBODIMENT OF THE INVENTION

Referring now to the drawings, a vehicle 10, such as a van, is fragmentarily shown. It should be understood, however, that the present invention is adapted to trucks, automobiles and other vehicles carrying a spare tire. The vehicle 10 includes a rear undersurface 12 (FIG. 2), the rear floor 14 (FIG. 3) and a vehicle frame 16, fragmentally shown, which includes the rear floor support cross member 18. Spaced from cross member 18 is the transverse rear panel 20 including the outer rear sill 22 connected to the floor 14 and to the inner sill 24.

The spare wheel mount bracket 26 includes opposed arcuate depending portions 28. The bracket 26 is appropriately connected to the vehicle frame as is well known in the art.

The tire lift mechanism 36 is for raising and lowering the spare tire 37 which is mounted beneath the underside 12 of the vehicle 10. The bracket 26 mounts an assembly 38 which includes known structure for raising and lowering the cable 40. Cable 40 is fixed to the tire retaining member 42 which is received in the opening 44 provided in the wheel flange 46 of the spare tire 37. The spare tire 37 bears against the arcuate depending portions 28 when the spare tire is in a raised position as best shown in FIG. 3.

The lift assembly or mechanism 38 may have a gear and pinion lift assembly in the casing 50 (FIG. 2) along with a pair of opposed side plates 52 having mount flanges 54 bearing against a central undersurface of the bracket 26 as best shown in FIG. 3. The mount flanges 54 are secured to the bracket 26 by means of fasteners 58 as best shown in FIGS. 2 and 3.

The tire lift assembly 36 includes a rotatable drive shaft 60 having an axis of rotation 62. The shaft 60 is referred to herein as the driven shaft and the axis of rotation is referred to herein as the second axis of rotation. The rotatable drive or driven shaft 60 is adapted to rotate a suitable drum 66 upon which is wound and anchored the cable 40. The input or driven shaft 60 has mounted thereon within the tire lift assembly 36 a pinion 68 in mesh with the gear 70 which is mounted upon the axis of rotation of the drum 66 for advancing or retracting the cable 40.

The compound angle drive of the present invention forms part of the tire lift mechanism 36. Compound angle drive includes an elongated tubular member called the "drive tube" and which is designated by the numeral 74. The drive tube 74 has a longitudinally extending axis of rotation 76. The tube axis of rotation 76 is referred to herein and in the claims as the "first axis of rotation" while the axis of rotation 62 of the driven shaft 60 is referred to in the claims as the "second axis of rotation". The drive tube 74 and driven shaft 60 are approximately connected by a connection 78 such that the first axis of rotation 76 of the drive tube 74 may be nonparallel to the second axis of rotation 62 of the driven shaft 60 as best shown in FIGS. 3 and 4.

The drive tube 74 has a leading end 80 and a trailing end 82. The trailing end 82 is flared so as to form or define a funnel 84 having an entrance opening 86. A first plug 88 is located in the driven tube 74 adjacent the funnel 84 (FIG. 4). The first plug 88 is provided with a generally axially extending opening 90 of oval configuration which is aligned with the entrance opening 86 provided in the funnel 84. A second plug 92 is located in the drive tube 74 at the leading end 80. The second plug 92 has a centrally located recess 94 in the end 96 thereof facing in the direction of the driven shaft 60.

The drive tube 84 includes a plurality of circumferentially spaced drive pins 96 which are carried by the second plug 92 and which surrounds the recess 94. Three drive pins 96 are provided and are equally spaced apart about the periphery. The drive pins 96 are provided with enlarged heads 98. The pins are made from 1032 carbon steel, case hardened to an appropriate depth.

The driven shaft 60 carries a sleeve member 100 having a leading end 102 and a trailing end 104. The leading end 102 forms a tubular sleeve 106. The sleeve 106 of the leading end 102 receives the end of the driven shaft 60. A pin 108 connects the driven shaft 60 to the sleeve member 100 as is best shown in FIG. 4. The sleeve member 100 at the trailing end 104 is provided with an integral drive disc 110. The disc 110 has a plurality of notches 112 corresponding in number to the number of pins 96. In this case, there are three pins 96 and therefore three notches 112. The heads 98 of the pins 96 ride in an annular groove 99 and at different conditions may engage the side of the disc 110 facing the driven shaft 60. The drive pins 96 are designed to pivot within the notches 112 while still transmitting rotation from the drive member 74 to the driven member 60. The enlarged heads 98 which are integral with the pins 96 assist in retaining the drive pins 96 in the notches 112.

The trailing face of the disc 110 is provided with an axially extending solid spring guide element 116. The guide element 116 is relatively short and faces the recess 94 provided in the second plug 92. The purpose of the guide element 116 is to guide and retain the spring 118 in the recess 94 as best shown in FIGS. 4 and 5.

The first plug 88 has ends or end faces 119 and 121 which are chamfered. The outer periphery 126 of the first plug 88 is provided with a plurality of generally radially extending barbs 130. Each barb 130 extends from one end 122 of the first plug to the other end 119. The barbs are pointed and are located 90° apart. The sides of the barbs are at 45°. The barbs 130 assist in retaining the plug 88 in the drive tube 74.

In use and to provide a rotative drive for advancing or retracting the cable 40, all that is necessary is to axially project the jackhandle 120 (fragmentally shown in FIG. 4)

into the tubular guide member 122 which is mounted in the opening 123 of the outer real sill 22 of the vehicle. The guide 122 has a portion 124 which fits within the opening 86 of the funnel 82. The jackhandle 120 extends through the interior of the tubular guide member 122 and the funnel 82 into the oval shaped opening 90 provided in the first plug 88. Thereafter the handle 120 is rotated manually so as to rotate the drive tube 74 through the frictional engagement between the jackhandle 120 and the first plug 88.

The improved compound angle drive provides in effect a universal connection between the drive tube 74 and the driven tube or input shaft 60 of the lift assembly 36. The first axis of rotation 76 is arranged at an obtuse angle with respect to the second axis of rotation 62 of the driven shaft 60. Such angular relationship may be approximately 150° or stated differently at an included angle of 30° approximately. The angle may be varied between 0°, with axis 76 and 62 in alignment, and generally up to 150° or in the range of 150° to 180°, for illustration purposes.

From the foregoing, it is apparent that the novel invention provides a means for handling the spare tire and wheel of a vehicle in a manner which permits the removal of the tire and wheel from a storage position beneath the vehicle by only tuning a readily accessible compound angle drive having an entrance at the exterior of the vehicle and which does not require an operator to crawl beneath the vehicle to remove the spare tire and wheel with great difficulty.

It is also apparent that the present invention provides a spare tire and wheel lift mechanism which, due to its simplicity, is easy and economical to construct and which has a long service life. Similarly, the spare wheel lift and drive assembly has a sturdy and rugged construction which may be easily operated by a single operator with a minimum of effort.

It is further apparent that the present invention provides a method for handling the spare tire and wheel in a manner which permits an operator to store the spare tire and wheel in a horizontal position beneath the vehicle by only tuning a crank in a direction opposite to that direction which is utilized in removing the tire and wheel from its stored position.

It should further be appreciated that changes may be made in the combination and arrangement of parts or elements as heretofore set forth in the specification and shown in the drawings, it being understood that changes may be made in the precise embodiment disclosed without departing from the spirit and scope of the invention as defined in the claims which follow.

I claim:

1. A tire lift mechanism comprising:

a cable;

an elongated drive tube having a first longitudinal axis of rotation and, said elongated drive adapted to be selectively rotated to cause said cable to be raised and lowered;

a driven shaft having a second longitudinal axis of rotation and, said driven shaft adapted to rotate structure for raising and lowering said cable, said driven shaft being driven by said drive tube, said drive tube and said driven shaft being operatively connected by a connection such that the first axis of rotation of said drive tube may be non-parallel to said second axis of rotation of said driven shaft;

said drive tube having a pair of ends including a leading end and a trailing end, a first plug located in said driven tube adjacent said trailing end, said first plug having a generally axially extending opening therein aligned with said entrance opening, a second plug having a generally cylindrical shape and a diameter less than said drive tube located within said drive tube at the leading end of said drive tube, said second plug having a centrally located recess in the end thereof facing in the direction of said driven shaft;

said drive tube including a plurality of circumferentially spaced drive pins carried by said second plug within said drive tube and surrounding said recess, said drive pins extending in a direction away from said second plug towards said driven shaft;

said driven shaft having thereon a sleeve member having a leading end forming a tubular sleeve and a trailing end, the sleeve of said leading end receiving said driven shaft and being connected thereto, said sleeve member at the trailing end thereof having an integral drive disc, said disc having notches on the periphery thereof for receiving said drive pins to permit the drive pins to pivot within said notches but still transmit rotation to said driven shaft; and a spring located in said recess between said second plug and said drive disc.

2. The tire lift mechanism defined in claim 1, wherein the outer ends of said drive pins are provided with enlarged heads for assisting in retaining said drive pins in said notches.

3. The tire lift mechanism defined in claim 2, wherein said heads are integral with said drive pins.

4. The tire lift mechanism defined in claim 1, wherein said disc has an axially extending solid guide element facing said second plug for guiding and retaining said spring.

5. The tire lift mechanism defined in claim 1, wherein the outer periphery of said first plug is provided with a plurality of generally radially extending barbs, each barb extending from one end of said first plug to the other end thereof, said barbs assisting in retaining the plug in said drive tube.

6. The tire lift mechanism defined in claim 5, wherein there are four barbs which are spaced 90° apart.

7. The tire lift mechanism defined in claim 6, wherein the ends of said first plug are provided with chamfers.

8. A tire lift mechanism defined in claim 1, wherein said trailing end being flared to define a funnel.

9. A spare wheel lift for a vehicle having a frame, a downwardly facing mount bracket secured upon the underside of the frame and adapted to receive a spare wheel, a lift mechanism centrally underlying the bracket and said bracket secured thereto, including a cable extending from the lift mechanism and a rotative drive connected to the cable for selectively extending and retracting said cable and a spare wheel support connected to said cable, the improvement comprising a compound angle drive extending through said bracket and at one end universally connected to said rotative drive, whereby on selective rotation of said drive means, the cable and wheel support retract against said spare wheel holding said wheel support and wheel in compressive retaining engagement with said mounting bracket, and upon rotation in the opposite direction, lowering said wheel to the ground surface;

said compound angle drive including an elongated drive tube having a first longitudinal axis and adapted to be selectively rotated to cause said cable to be raised and lowered;

a driven shaft having a second longitudinal axis of rotation and adapted to rotate structure for raising and lowering said cable, said driven shaft being selectably driven by said drive tube, said drive tube and said driven shaft being operably connected by a connection such that the first axis of rotation of said drive tube may be non-parallel to the said second axis of rotation of said driven shaft;

said drive tube having a pair of ends including a leading end and a trailing end, said trailing end having an entrance opening for receiving a tool, a first plug located in said driven tube adjacent said trailing end, said first plug having a generally axially extending opening therein aligned with said entrance opening, a second plug located in said drive tube at the leading end of said drive tube, said second plug having a centrally located recess in the end thereof facing in the direction of said driven shaft;

said drive tube including a plurality of circumferentially spaced drive pins carried by said second plug within said drive tube and surrounding said recess, said drive pins extending in a direction away from said second plug toward said driven shaft;

said driven shaft having thereon a sleeve member having a leading end forming a tubular sleeve and a trailing end, the sleeve of said leading end receiving said driven shaft and being connected thereto, said sleeve member at the trailing end thereof having an integral drive disc, said disc having notches on the periphery thereof for receiving said drive pins to permit the drive pins to pivot within said notches but still transmit rotation from said drive tube to said driven shaft to raise or lower said cable and said wheel; and a spring located in said recess between said second plug and said drive disc.

10. The spare wheel lift and drive assembly of claim 9, further comprising means for rotatably mounting said drive tube in said bracket; and an elongated manually rotatable tool projected through the entrance opening of said trailing end and into the axially extending opening of said first plug to thereby frictionally engaging said drive tube.

11. The spare wheel lift defined in claim 9, wherein the outer ends of said drive pins are provided with enlarged heads for assisting in retaining said drive pins in said notches.

12. The spare wheel lift defined in claim 11 wherein said heads are integral with said drive pins.

13. The spare wheel lift in claim 9, wherein said disc has an axially extending solid guide element facing said second plug for guiding and retaining said spring.

14. The spare wheel lift defined in claim 9, wherein the outer periphery of said first plug is provided with a plurality of generally radially extending barbs, each barb extending from one end of said first plug to the other end thereof, said barbs assisting in retaining the plug in said drive tube.

15. The spare wheel lift defined in claim 14, wherein there are four barbs which are spaced 90° apart.

16. The spare wheel lift defined in claim 15, wherein the ends of said first plug are provided with chamfers.

17. The spare wheel lift defined in claim 9, wherein said trailing end being flared to define a funnel.

* * * * *